T. H. ABERNETHY.
CAR DOOR SECURING MEANS.
APPLICATION FILED NOV. 21, 1911.
1,049,966.
Patented Jan. 7, 1913.
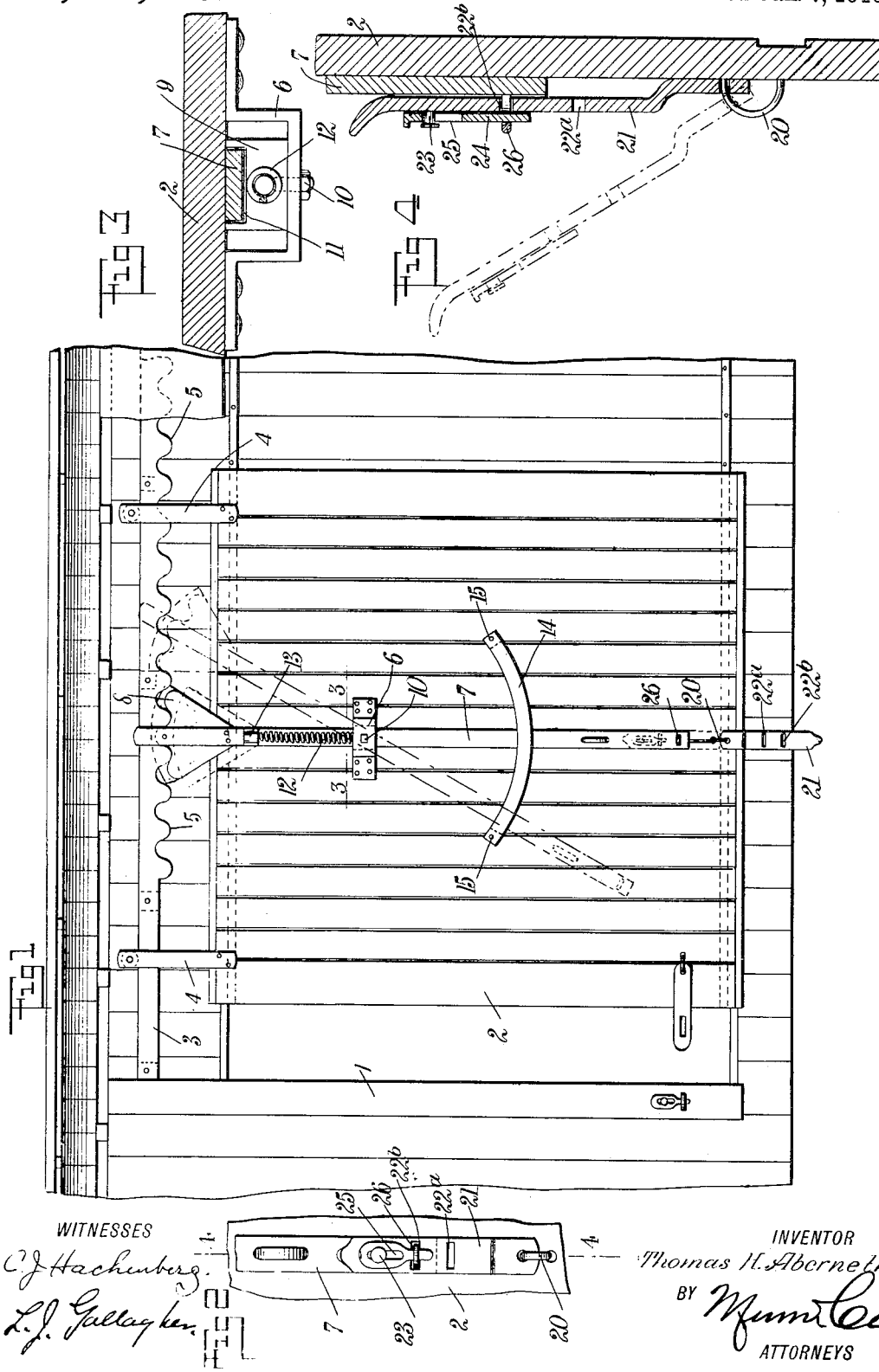
WITNESSES
INVENTOR
Thomas H. Abernethy
BY Munn & Co
ATTORNEYS

UNITED STATES PATENT OFFICE.

THOMAS HENRY ABERNETHY, OF SHELBY, NORTH CAROLINA.

CAR-DOOR-SECURING MEANS.

1,049,966.  Specification of Letters Patent.  Patented Jan. 7, 1913.

Application filed November 21, 1911. Serial No. 661,556.

*To all whom it may concern:*

Be it known that I, THOMAS H. ABERNETHY, a citizen of the United States, and a resident of Shelby, in the county of Cleveland and State of North Carolina, have invented a new and Improved Car-Door-Securing Means, of which the following is a full, clear, and exact description.

My invention relates to a car door securing means and more particularly is directed to an improvement in this art whereby the said securing means when released may serve the purposes of a lever to assist in opening or closing the door.

The principal object of the invention is to provide a new and improved car door securing means, the construction and arrangement being such that when the said means is released it will serve the purposes of a lever whereby it may be moved into different positions, thereby enabling a car door to be easily opened or closed.

Other objects and advantages of the invention will appear as the description thereof proceeds, all of which is particularly pointed out and included in the appended claims.

Reference is to be had to the accompanying drawings forming a part of this specification in which similar characters of reference denote corresponding parts in all the views, and in which—

Figure 1 is a partial side view of a car door showing my device in position therein; Fig. 2 is a detail view of the hasp and staple for securing the said means in position; Fig. 3 is a sectional view on the line 3—3 of Fig. 1; Fig. 4 is a sectional view on the line 4—4 of Fig. 2.

The side of any suitable car 1 is provided with a sliding door 2 of any desired size or shape, the side of the car above the door being provided with a track 3 adapted to support the door through the medium of hangers 4 positioned thereon. The length of the track 3 will depend upon the size of the opening in the side of the car, the intermediate portion of the track for a suitable length and on its lower portion being notched or serrated whereby a rack 5 is formed.

Pivotally secured to the side of the door 2 in a suitable securing means, such as a strap 6, is the lever 7, the lower end thereof serving as a handle, the upper portion being provided with a segment or offset having teeth 8 thereon adapted to engage in the rack 5 on the side of the car.

Referring particularly to Fig. 3 it will be noted that the lever 7 passes through a suitable block 9 which is movably supported between the strap 6 and the side of the door 2 on a pin 10, which passes through the strap, the block being provided with a suitable recess 11 through which the lever extends. By reason of the recess in the block 9 the position of the lever 7 with respect thereto is determined, the upper end of the lever being retained in engagement with the rack 5 by means of a helical spring 12, one end of which engages the block 9, the other end of which is secured to the lever 7 by any suitable means such as a lug 13.

From what has been described it will be apparent that the lever 7 may assume a number of different positions which are radial with respect to the pin, two positions being shown in Fig. 1, such positions being obtained by pulling downwardly on the lever 7 against the tension of the spring 12, thereby bringing the toothed segment 8 out of engagement with the rack 5, and then turning the lever and block about the pin 10 as a center until the lever occupies the desired position, such as shown in dotted lines in Fig. 1. The limit of movement of the lever 7 may be determined and the lever held more securely in position on the door by any suitable means, such as a strap 14, the ends 15 of which are secured to the door, the intermediate portion thereof being remote from the door and providing limited travel for the lever.

As a means of retaining the lever in the full line position of Fig. 1, I make use of a locking device shown particularly in Figs. 2 and 4; adjacent the lower end of the door and movably supported on a suitable device, such as a staple 20, is a hasp 21 having a plurality of openings 22$^a$, 22$^b$, therein, the upper portion of the hasp being provided with a headed pin 23 on which is mounted a locking bolt 24 having a slot 25 therein through which the aforesaid pin passes. The lower end of the lever 7 is provided with a suitable staple 26 adapted to extend through either of the openings 22$^a$, or 22$^b$ in the hasp 21, the staple when passing through either opening being adapted to be engaged by the bolt 24, as shown particularly in Fig. 4.

My locking means is especially adapted for use on box cars or freight cars in order to hold the door secured in any desired open or closed position, the operation thereof being as follows. By bringing the locking bolt 24 out of engagement with the staple 26, the hasp 21 may be brought to the broken line position of Fig. 4 and out of engagement with the lever 7, thereby permitting the same to be moved downwardly whereby the toothed segment 8 is freed from engagement with the rack 5, permitting the door to slide bodily on the track 3. After the door has been brought to desired position the lever 7 is permitted to move upwardly, the segment 8 again engaging the rack 5 on the track 3, the hasp being then brought to locked position shown in Figs. 2 or 4, the door being then secured. It may be desirable in some instances to secure the locking means out of engagement with the rack 5, in which event the lever 7 may be moved downwardly and the staple 26 thereon may be engaged in the lower opening 22ª in the hasp, after which the locking bolt 24 is again brought into locked position, the door being then freely slidable on the track 3. When the locking means has been secured in place the door is sealed by passing the customary seal through the staple 26, movement of the hasp being then prevented without breaking the seal.

It very often happens in the loading or unloading of freight cars that the doors are difficult to move and become fast in position, and in order to overcome this difficulty, the construction before-mentioned is adapted to serve the purposes of an opening or closing lever in operating the door. Referring particularly to Fig. 1, it being desirable to open the door, the same being fast in position, the hasp 21 may be brought into the position shown in this figure, after which the lever 7 may be pulled downwardly and may be turned to the broken line position, after which it is released, the segment cr offset 8 then engaging the rack 5 to the right of the normal position of the lever, the lever then providing an opening means for the door by pulling to the right on the lower end thereof, the fulcrum of the lever being the engaging points of the rack and the segment; after the door has been opened, the lever may be returned to normal, locked, or unlocked position. When the car door is to be closed the movement of the door may be facilitated by again using the locking lever 7 as an actuating device in moving the door, in which case it may be brought to the left of the position shown in Fig. 1 and force applied at its other end whereby a lever of the second class is provided, the force to be overcome being at the point of pivotal support between the lever and the door and the point of application of the effort being at the lower end of the lever.

Of course the material of which the different parts of the device are made will depend upon the cars to which it is applied as well as the size of the doors used on such cars, the material and the strength of such material of the different parts being such that the device may be efficiently used in facilitating the opening and closing of the doors, as well as in the locking thereof.

Having thus described my invention, I claim as new, and desire to secure by Letters Patent:—

1. The combination of a car door, a lever pivotally mounted thereon, resilient means between the pivot and the lever whereby the point of pivotal support intermediate the ends of the lever may be varied, together with a fixed element adjacent one end of the lever and with which it is adapted to engage, there being other means adjacent the other end of the lever whereby the position therof may be maintained.

2. The combination of a door, a fixed element adjacent thereto, a lever pivotally mounted on the door, one end of the lever being in engagement with the said element, a pin about which the lever swings, a spring engaging the lever, guiding means adjacent the pivot, the said spring engaging the guiding means whereby the lever may be moved transversely of the pivot and the said end of the lever may be brought into engagement with different portions of the said fixed element.

3. The combination of a horizontally movable door, a rigid lever pivotally secured on the door, fixed horizontally extending means adjacent the door with which one end of the lever is adapted to engage, the other end of the lever serving as a handle, whereby the door may move with the end of the lever engaging the said fixed means.

4. The combination of a horizontally movable door, a lever pivoted thereto, the outer end of the lever swinging on the arc of a circle about the pivoted support, fixed horizontally extending means adjacent one end of the lever with which the said end is adapted to engage, the opposite end of the lever serving as a handle.

5. The combination of a horizontally movable door, a rigid lever thereon, means for pivotally securing the lever in position, the lever being movable transversely of the said means and also adapted to swing about the said pivotal means, the outer end of the lever moving in the arc of a circle, together with a fixed horizontally extending element adjacent the door with which the said end of the lever is adapted to engage, the other end of the lever serving as a handle, whereby the door may be opened with the said end of the lever engaging the said fixed element.

6. The combination of a door, a rigid lever pivotally mounted thereon, one end of the lever being provided with a toothed offset, a rack carried adjacent the said offset and in engagement therewith, the other end of the lever forming a handle, means whereby the lever may be moved transversely of the pivotal support in order to move the said offset out of engagement with the said rack, together with means carried by the door engaging the said handle whereby the engagement of the offset and the rack is maintained.

In testimony whereof I have signed my name to this specification in the presence of two subscribing witnesses.

THOMAS HENRY ABERNETHY.

Witnesses:
 GEO. B. SANTON,
 J. N. DELLINGER.

Copies of this patent may be obtained for five cents each, by addressing the "Commissioner of Patents, Washington, D. C."